United States Patent [19]
Nozaki et al.

[11] Patent Number: 5,207,029
[45] Date of Patent: May 4, 1993

[54] WEATHER STRIP

[75] Inventors: Masahiro Nozaki; Masahiro Koide, both of Inazawa, Japan

[73] Assignee: Toyoda Gosei Co., Ltd., Nishikasugai, Japan

[21] Appl. No.: 910,871

[22] Filed: Jul. 9, 1992

[30] Foreign Application Priority Data

Jul. 10, 1991 [JP] Japan ................... 3-53526

[51] Int. Cl.⁵ .............................. E06B 7/16
[52] U.S. Cl. ................. 49/495.1; 49/490.1; 49/498.1; 49/506
[58] Field of Search ........... 49/495, 488, 491, 490, 49/497, 498, 475, 506

[56] References Cited

U.S. PATENT DOCUMENTS

| | | | |
|---|---|---|---|
| 4,497,137 | 2/1985 | Nelson | 49/495 X |
| 4,505,965 | 3/1985 | Zipperle . | |
| 4,617,220 | 10/1986 | Ginster | 49/490 X |
| 4,945,681 | 8/1990 | Nozaki et al. . | |
| 4,969,294 | 11/1990 | Guillon et al. | 49/495 |
| 5,005,317 | 4/1991 | Saint-Louis Augustin et al. | 49/495 |
| 5,027,556 | 7/1991 | Ginster | 49/495 X |
| 5,038,522 | 8/1991 | Nozaki . | |
| 5,054,241 | 10/1991 | Mishima et al. | 49/497 X |
| 5,154,952 | 10/1992 | Nozaki | 49/475 X |

FOREIGN PATENT DOCUMENTS 675687  7/1952  United Kingdom ............ 49/495

*Primary Examiner*—Philip C. Kannan
*Attorney, Agent, or Firm*—Cushman, Darby & Cushman

[57] ABSTRACT

A weather strip is provided having a first seal, a second seal and a connecting portion so as to be engaged by a small engaging force with a flange having engaging portions on both sides thereof. The connecting portion, being made of hard material, connects a receiving portion of a first seal and a receiving portion of a second seal. A longitudinal groove or a bending portion made of soft material is provided near the receiving portion of the second seal of the connecting portion. The weather strip can be easily engaged with a seal supporting portion of the flange by a bending action of the connecting portion.

11 Claims, 3 Drawing Sheets

WEATHER STRIP

BACKGROUND OF THE INVENTION

1. Field of the Invention

The present invention relates to a weather strip for a motor vehicle. More particularly, the invention relates to a weather strip for a vehicle door or trunk and includes a first seal, a second seal and receiving portions for engagement with a flange which has an engaging projection on both sides thereof.

2. Description of the Related Art

Conventional weather strips are described in U.S. Pat. Nos. 5,038,522, 4,945,681 and U.S. Pat. No. 4,505,965.

FIG. 1 shows one such conventional weather strip 20 fixed to a flange 11 of the door sash 10 (FIG. 3). The door sash 10 for a slidable door window G is provided at the top of a door body D and the weather strip 20 is fixed to the flange 11 of the sash 10.

The weather strip 20 comprises a first seal 21 for contacting a counterpart of an opposite side member, such as a door opening, a base portion 25 of the first seal 21, a second seal 22 for contacting an edge of the counterpart of the opposite side member, a base portion 29 of the second seal 22, a connecting portion 23 which connects the first seal 21 and the second seal 22, a receiving portion 26 of the first seal 21, a receiving portion 27 of the second seal 22, and a hooking projection 24. When the weather strip 20 is fixed to the flange 11, the receiving portion 26 of the first seal 21 is engaged with an engaging portion 14, which is an inner edge of a seal supporting portion 12 of the flange 11 (FIG. 1). Pressure force F, applied in the direction of the arrow (FIG. 1) developed by pushing the connecting portion 23, creates a rotational motion about point P. The receiving portion 27 of the second seal 22 is engaged with an engaging portion 16, which is the outer edge of the seal supporting portion 12, and the weather strip 20 is fixed to the flange 11.

At that time, the rotational motion about point P is transferred to the connecting portion 23 due to force F. The hooking projection 24 engages an edge portion 18 of the engaging portion 16 and is pushed in the direction of an arrow R and, as the rotational motion proceeds, the force F becomes large. In order to easily fix the weather strip 20 to the flange 11, the force F must not bend the connecting portion 23, which must stay rigid in order to push the hooking projection 24 past the engaging portion 16. This requires increasing the rigidity of the connecting portion 23 by making the connecting portion 23 thicker, or by utilizing surface treatment with a slipping agent on the surface of the hooking projection 24.

SUMMARY OF THE INVENTION

It is an object of the present invention to provide a weather strip which is easily fixed to a flange, for example, in a trunk opening or trunk lid or in a door opening or door itself. In accordance with the principles of the present invention, the weather strip includes a first seal for contacting a counterpart of an opposite side member, a second seal being in contact with an edge of the counterpart of the opposite side member, a base portion of the first seal, a base portion of the second seal, a receiving portion of the first seal, a receiving portion of the second seal, and a connecting portion which connects the receiving portions. The connecting portion has a bending portion near the receiving portion of the second seal. The bending portion has a shape of longitudinal groove. Instead of the groove, soft material (i.e. sponge rubber) may be used for the bending portion. By providing the bending portion, the receiving portion is easily fixed to the flange. The receiving portion of the second seal has a hooking projection on the edge thereof.

Other objects, features, and characteristics of the present invention, as well as the methods and operation and functions of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE DRAWINGS

DETAILED DESCRIPTION OF THE PRESENTLY PREFERRED EXEMPLARY EMBODIMENTS

Figure 2:
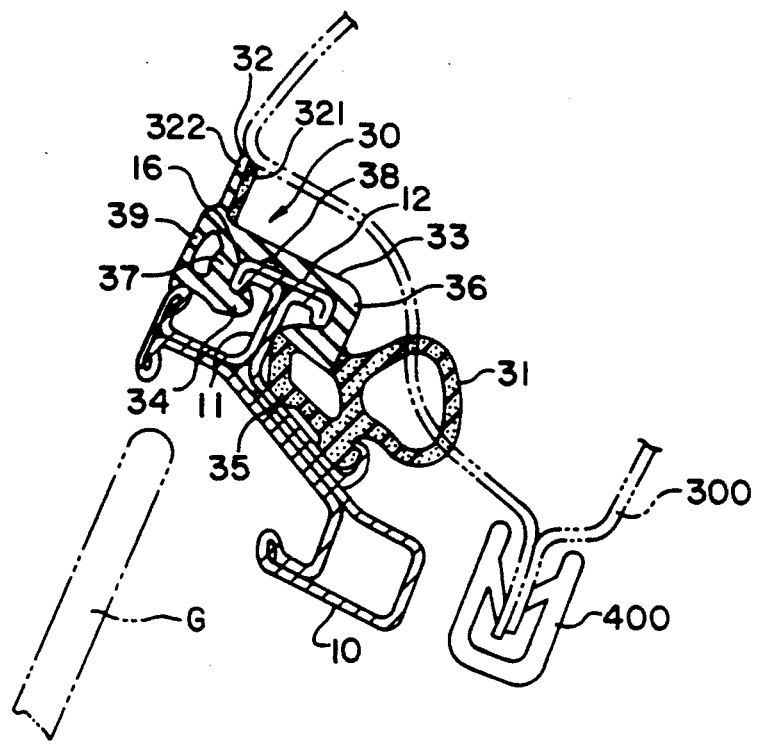
FIG. 2 shows a cross-sectional view of a weather strip of the present invention for a motor vehicle taken along the line 2—2 in FIG. 3.
Figure 3:
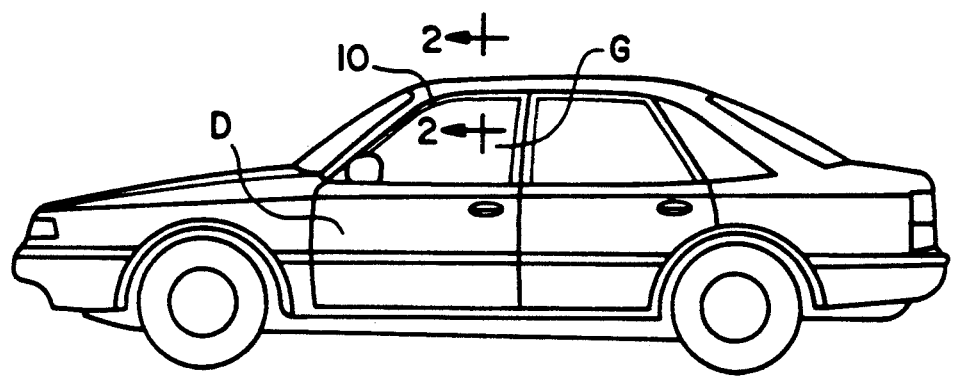
FIG. 3 shows a side view of a motor vehicle which has a door sash provided with the weather strip of the present invention.

As shown in FIG. 2, a weather strip 30, provided for a door sash, has a first seal 31 for contacting a counterpart of an opposite side member such as a door opening panel 300, a base portion 35 of the first seal 31, a second seal 32 for contacting an edge of the counterpart of the opposite side member, a base portion 39 of the second portion 32, a connecting portion 33, a receiving portion 36 of the first seal 31, and a receiving portion 37 of the second seal 32. The connecting portion, being preferably made of solid rubber, connects the receiving portions 36 and 37. The receiving portion 36 connects with the base portion 35 and the receiving portion 37 connects with the base portion 39. The first seal 31 is a tubular figure, preferably made of sponge rubber, projecting from the base portion 35. The second seal 32 has two layers; the inner side layer 321 is preferably made of sponge rubber and the outer side layer 322 is preferably made of solid rubber.

Figure 1:
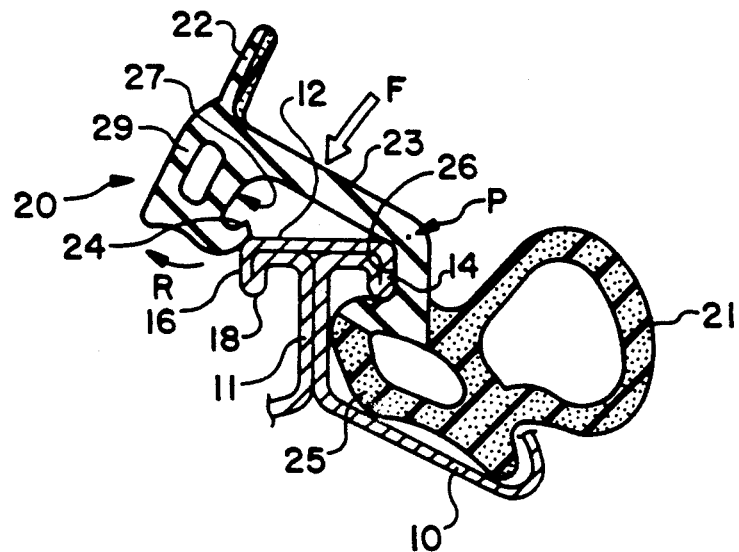
FIG. 1 shows a cross-sectional view of a conventional weather, strip.
Figure 4:
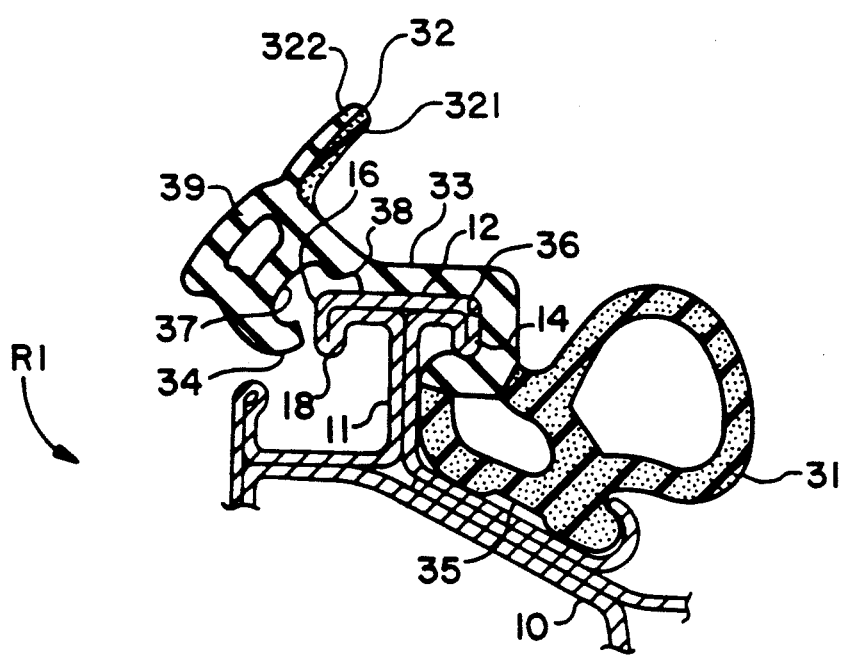
FIG. 4 shows a cross-sectional view of a weather strip of the present invention shown with a first seal engaged with a door sash and with a second seal shown prior to engagement.

In the first embodiment of the present invention, general thickness of the connecting portion 33 is thinner than the connecting portion 23 of the conventional weather strip 20 (FIG. 1) and a longitudinal groove 38 is provided on the inner surface of the connecting portion 33 adjacent the receiving portion 37 of the second seal 32. As shown in FIG. 4, the receiving portion 36 is engaged with an engaging portion 14 of a flange 11 of a door sash 10, which is disposed at the inner side of the seal supporting portion 12 of flange 11. Upon a rotational motion about the groove 38 in the direction of arrow R1, a hooking projection 34, provided as a means for a fastening, engages with flange 11 over an edge portion 18 of the engaging portion 16. The receiving portion 37 is then engaged with the engaging portion 16. The hooking projection 34, which projects from the receiving portion 37, is deformed slightly while sliding on the surface of the engaging portion 16. The length of the contact between the hooking projection 34 and the engaging portion 16 becomes much shorter than the conventional weather strip 20 (FIG. 1). As a result, the weather strip 30 is fixed to the flange 11 of the door sash 10 by lightly pushing the connecting portion 33. In fact, when the weather strip 30 is fixed to the door sash 10, there is no need to exert a large stress on the connecting portion 33, as in the prior art. Therefore, the thickness of the connecting portion 33 can be thinner than in the prior art (5%-20%) and the cost of material can be decreased. Even if there is some variation in dimension at the seal supporting portion 12 of the flange 11 or the weather strip 30, the weather strip 30 easily engages with the flange 11 by utilizing a bending portion, which includes the groove 38 of the connecting portion 33.

Figure 5:
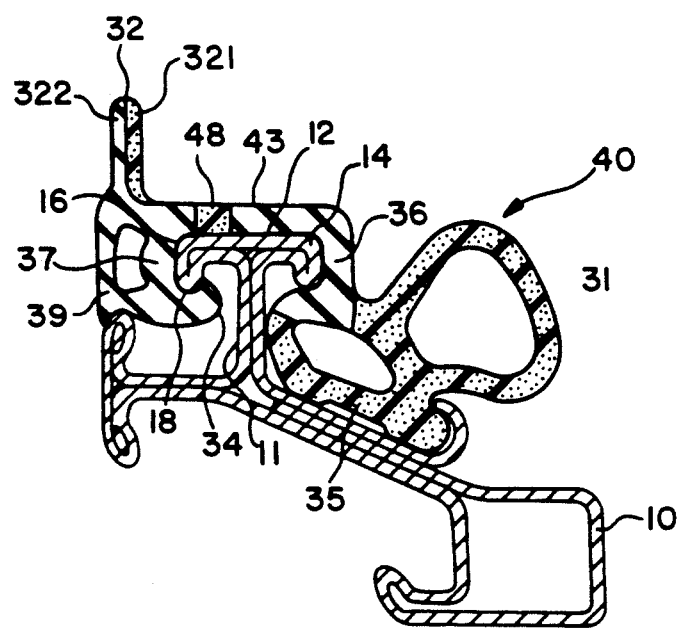
FIG. 5 shows a cross-sectional view of a weather strip according to a second embodiment of the present invention.

A second embodiment of the present invention is shown in FIG. 5. A weather strip 40, provided for a door sash, has a soft material (i.e. sponge rubber) portion 48 which is a part of the connecting portion 43 and functions as a bending portion, instead of the groove 38 as in the first embodiment. Other structure is similar to that of the first embodiment. The soft material portion 48 provided longitudinally in the connecting portion 43 functions similarly to the groove 38 of the first embodiment and it achieves the same desired end.

Figure 6:
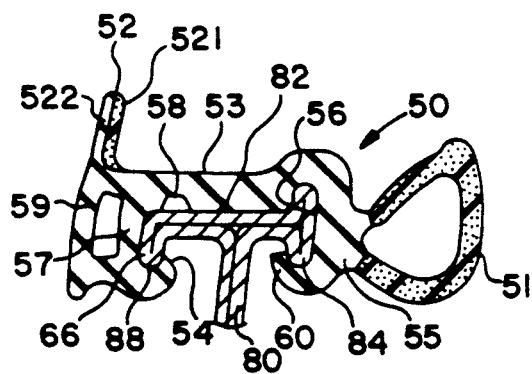
FIG. 6 shows a cross-sectional view of a weather strip according to a third embodiment of the present invention.

A third embodiment of the present invention is shown in FIG. 6. A weather strip 50, provided for a trunk opening, is different from the first embodiment. The weather strip 50, which is fixed to a trunk opening flange 80, has a first seal 51 for contacting a counterpart of an opposite side member such as a trunk lid, a base portion 55 of the fist seal 51, a second seal 52 for contacting an edge of the counterpart of the opposite side member, a base portion 59 of the second seal 52, a connecting portion 53, a receiving portion 56 of the first seal 51, a receiving portion 57 of the second seal 52. The first seal is preferably made of sponge rubber and has a tubular form. The second seal 52 has two layers; the inner side layer 521 is preferably made of sponge rubber and the outer side layer 522 is preferably made of solid rubber. The receiving portion 56 of the first seal 51 has a hooking projection 60 which is similar to the hooking projection 54 of the receiving portion 57. The hooking projection 54 is engaged with an edge portion 88 of the engaging portion 66. The base portion 55 is engaged with an engaging portion 84 of a seal supporting portion 82. By providing a longitudinal groove 58 defining a bending portion in the connection portion 53 near the receiving portion 57, the weather strip attains the same action and effect as in the first embodiment.

Figure 7:
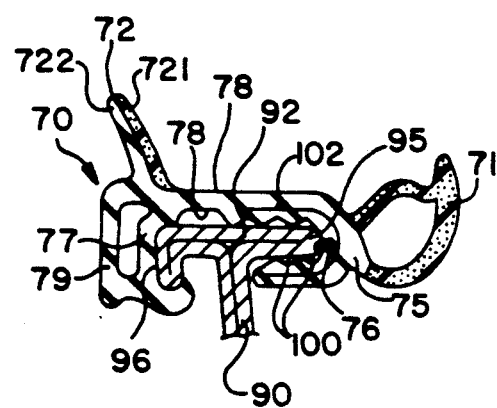
FIG. 7 shows a cross-sectional view of a weather strip according to a fourth embodiment of the present invention.

FIG. 7 shows a fourth embodiment of the invention which is useful for a trunk opening. A weather strip 70, fixed to a trunk opening flange 90, has a first seal 71 for contacting with a counterpart of an opposite side member such as a trunk lid, a base portion 75 of the first seal 71, a second seal 72 for contacting with an edge of the counterpart of the opposite side member, a base portion 79 of the second seal 72, a connecting portion 73, a receiving portion 76 of the first seal 71, a receiving portion 77 of the second seal 72. The receiving portion 76 having a U-shape, has an insert 102 and supporting lips 100, which support a seal supporting portion 92 on the inner side thereof. The receiving portion 77 is engaged with an engaging portion 96. The edge portion 95 of the trunk opening flange 90 is not hook-shaped. The first seal is preferably made of sponge rubber and has a tubular form. The second seal 72 has two layers; the inner side layer 721 is preferably made of sponge rubber, and the outer side layer 722 is preferably made of solid rubber. By forming the thin walled portion 78, or a longitudinal groove in the first embodiment defining a bending portion near the receiving portion 77, the weather strip 70 achieves the same desired end.

While the invention has been described in connection with what is presently considered to be the most practical and preferred embodiments, it is to be understood that the invention is not to be limited to the disclosed embodiments, but on the contrary, is intended to cover various modification are equivalent arrangements included with the spirit and scope of the appended claims.

What is claimed is:

1. A weather strip for engaging a flange, said flange having first and second engaging portions, said weather strip comprising:
    a first seal having a first receiving portion;
    a second seal having a second receiving portion;
    a connecting portion connecting said first and second receiving portions; and
    means for bending defined in said connecting portion and being disposed adjacent said second receiving portion, said second receiving portion including means for fastening defined on an end thereof, said first receiving portion engaging with said first engaging portion of the flange, pressure applied to said connecting portion permitting said second receiving portion to bend about said bending means permitting engagement of said second receiving portion and said fastening means with said second engaging portion of the flange so as to affix the weather strip to the flange.

2. The weather strip according to claim 1, wherein said connecting portion is made of solid rubber.

3. The weather strip according to claim 1, wherein said first seal is a tubular seal made of the sponge rubber.

4. The weather strip according to claim 1, wherein an inner side of said second seal is made of sponge rubber and an outer side thereof is made of solid rubber.

5. The weather strip according to claim 1, wherein said means for bending include a groove defined in said connecting portion.

6. The weather strip according to claim 1, wherein said means for bending includes material which is more flexible than material of said connecting portion so as to facilitate bending.

7. The weather strip according to claim 1, wherein said first receiving portion includes a fastening element.

8. The weather strip according to claim 1, wherein said first receiving portion has a U-shape.

9. The weather strip according to claim 8, wherein said first receiving portion includes an insert.

10. The weather strip according to claim 9, wherein said first receiving portion includes supporting lips which engage with said first engaging portion of the flange.

11. A method of installing a weather strip to a flange, the weather strip including a first seal having a first receiving portion; a second seal having a second receiving portion; a connecting portion connecting said first and second receiving portions; and means for bending defined in said connecting portion and being disposed adjacent said second receiving portion, said second receiving portion including means for fastening defined on an end thereof, the flange including an upper surface having first and second engaging portions disposed at opposing ends thereof, the method comprising the steps of:

engaging said first receiving portion with said first engaging portion of the flange;

disposing said connecting portion so as to engage with said upper surface of the flange;

bending said connecting portion about said bending means; and engaging said second receiving portion and said fastening means with said second engaging portion of the flange so as to affix the weather strip to the flange.

* * * * *